SERIAL-TO-PARALLEL AND PARALLEL-TO-SERIAL BUFFER-CONVERTER USING A CORE MATRIX

Filed Feb. 1, 1965 4 Sheets-Sheet 1

INVENTOR.
RICHARD J. SAHULKA
BY Ronald L. Kunsdor
ATTORNEY

United States Patent Office 3,333,253
Patented July 25, 1967

3,333,253

SERIAL-TO-PARALLEL AND PARALLEL-TO-SERIAL BUFFER-CONVERTER USING A CORE MATRIX

Richard J. Sahulka, Peekskill, N.Y., assignor to International Business Machines Corporation, New York, N.Y., a corporation of New York Filed Feb. 1, 1965, Ser. No. 429,356
20 Claims. (Cl. 340—172.5)

This invention relates to a device for either accepting data units in parallel and for serially applying the bits of each data unit to the proper one of a plurality of output transmission lines or for receiving data units on a serial-by-bit basis from a plurality of input transmission lines and assembling them to be read out in parallel, and more particularly to an improved buffer for such devices.

As computer systems grow larger, there is an increasing tendency to use a single computer to solve the problems of many users and to communicate with the computer system from a number of remote terminals. Each of the remote teerminals may or may not have its own smaller computer system. Since, in most such applications, the central computer is time shared, some efficient means must be provided for applying inquiries and data to the central computer and for disseminating the replies generated by the computer to the various remote terminals. One way in which this may be accomplished is to connect a terminal to the computer until an indication is received that a complete message has been transferred. This process is repeated for each terminal. Another approach is to either receive the data units or distribute the replies on a serial-by-bit basis to the different terminals. From a user standpoint, the latter approach is more efficient and more satisfactory. In implementing this approach, some of the criteria which are considered are the cost of the hardware involved, the simplicity of control, the capacity of the system to handle any number of terminals, the ability of the system to vary the number of terminals without disrupting the system, the ability of the system to handle data units of different lengths, the adaptability of the technique to high bit transmission rates, and the compatibility of the transmission system with the overall computer system.

It is therefore a primary object of this invention to provide an improved system for disseminating information to a plurality of remote terminals or for receiving information from these terminals.

A more specific object of this invention is to provide an improved system for either transmitting data units to the remote terminals or receiving data units from the remote terminals where the data units on the lines interconnecting the remote terminals and the central station are serial by bit.

Another object of this invention is to provide a system of the type described above which operates in an extremely efficient manner.

Still another object of this invention is to provide a system of the type described above which is semi-modular in form so as to be capable of handling any number of remote terminals and any length data unit.

A further object of this invention is to provide a system of the type described above which is economical both to build and operate.

A still further object of this invention is to provide a system of the type described above which is adaptable to high bit transmission rates.

Another object of this invention is to provide a system of the type described above which is generally compatible with existing computer systems.

In accordance with these objects, this invention provides a memory device such as a magnetic core matrix memory array which has a plurality of individually addressable memory positions arranged in a matrix of rows and columns. This memory serves as a buffer for either data unit distribution or a data unit assembly system. For a data unit distribution system, a data unit such as a reply to a remote terminal, is applied in parallel to a shift register which in turn applies the data unit to the memory device on a bit-by-bit basis. The accessing of the memory device is controlled such that it may either be accessed on a row-by-row or column-by-column basis. When accessed on a row-by-row basis, the memory positions in a row of the matrix are sequentially accessed with the memory positions of the succeeding row being sequentially accessed following the accessing of the last memory position in the initial row. When the memory is being accessed on a column-by-column basis, the memory positions in a column of the matrix are sequentially accessed with the first memory position of the following column being accessed after the last memory position of the initial column has been accessed. Each access to the memory includes a read-out operation followed by a write-in operation.

When the system is operating in the data unit distribution mode, the outputs from the memory are applied to a cyclically operating distribution device which sequentially connects the output from the memory to succeeding ones of the output lines. Conversely, when the system is operating in the data unit assembling mode, the serial-by-bit inputs from the various terminals are applied through the distribution device to the input of the memory device and are stored in the memory device on either a row-by-row or column-by-column basis, depending on the state of the control device. The outputs from the memory are applied to the shift register a bit at a time until a full data unit has been assembled. When a full row or full column of the memory device has been accessed, a new cycle of the distribution device is initiated and either a new data unit is read into the shift register or the data unit in the shift register is read out, depending on whether the system is operating in a distributing or assembling mode. For either mode of operation, when all memory positions in the memory device have been accessed, the state of the control device is altered so that, if the memory was being accessed on a column-by-column basis, it is now accessed on a row-by-row basis, and vice versa. Several planes of memory devices may be used under control of a single control device to provide the capacity to service a large number of remote terminals.

The foregoing and other objects, features and advantages of the invention will be apparent from the following more particular description of preferred embodiments of the invention as illustrated in the accompanying drawings.

Figure 1:
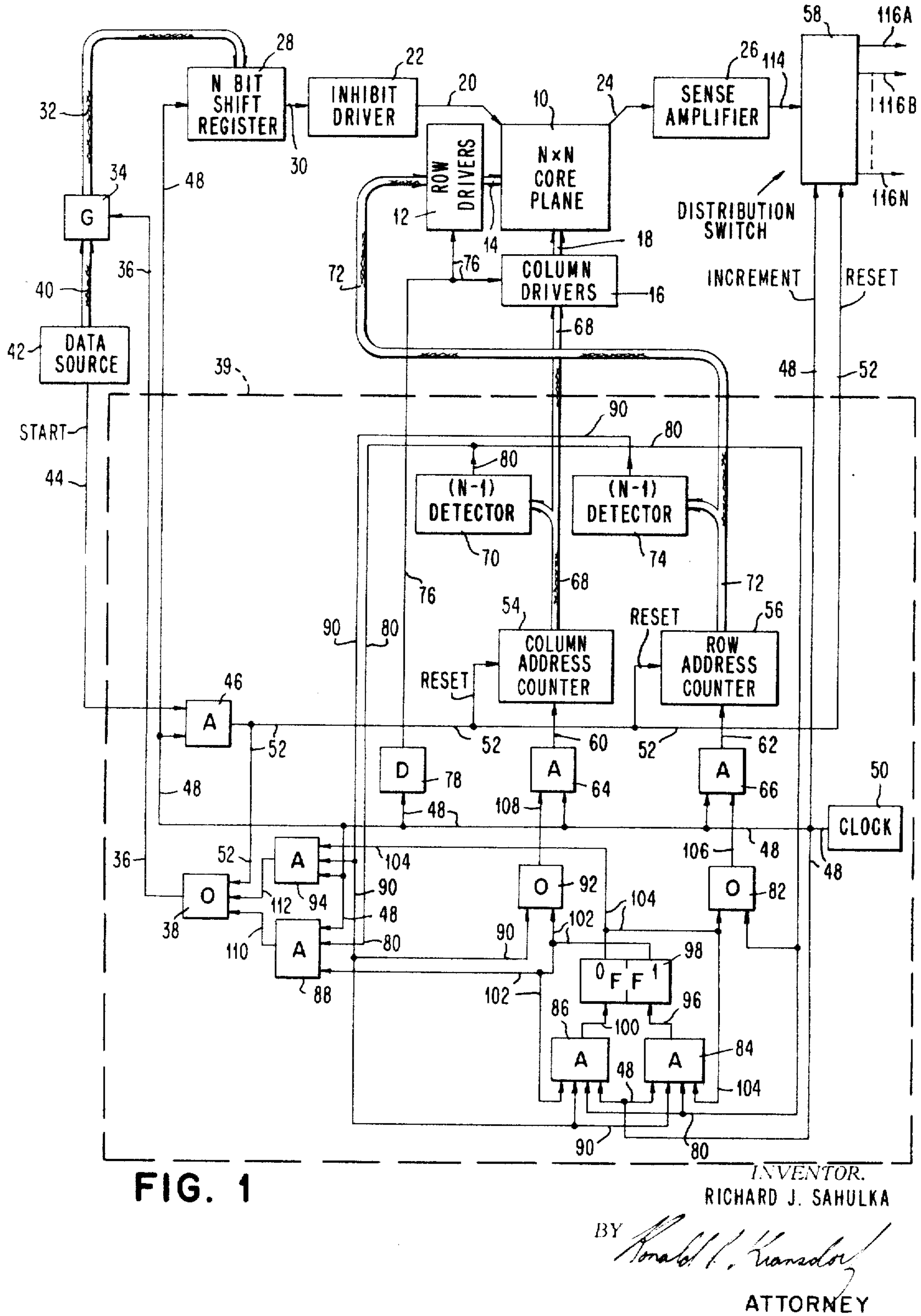
FIG. 1 is a block diagram of a data unit distribution embodiment of the invention.

*General description of FIG. 1*

Referring now to FIG. 1, it is seen that the circuit of this embodiment of the invention includes an N x N magnetic core matrix memory array 10. Coincident selection in memory 10 is achieved by row drivers 12 energizing one of N row address lines 14 and by column drivers 16 energizing one of N column address lines 18. Row and column drivers 12 and 16 are of the type which generate a read-out signal followed by a write-in signal. Memory 10 also has an inhibit line 20 which may or may not have a signal on it at any given time, depending on the condition of inhibit driver 22 and a sense line 24 which applies an output signal to sense amplifier 26. The state of inhibit driver 22 is determined by the bit in the right-most position of the N-bit shift register 28, which bit is applied to driver 22 through line 30. A data unit which may be up to N bits in length is applied in parallel to N-bit shift register 28 through output lines 32 from gate 34. The conditioning input to gate 34 is output line 36 from OR gate 38 in control circuit 39. The inputs to OR gate 38 will be described later. The data inputs to gate 34 are lines 40 from data source 42. Data source 42 may, for example, be a memory device in a digital computer system. The memory device could, for example, be a magnetic tape on which the first data units to be applied to each of the output lines are stored in succession followed by the second data units to be applied to each of the lines in succession and so on, or it could be a random access memory containing a queue of data units to be distributed to each of the output lines. An address register could, for example, be provided for each queue with the address of the next data unit to be read out from the associated queue contained therein and the address registers sequentially scanned so as to cause the first data units from each of the queues to be applied in succession to lines 40 followed by the second data unit from each queue and so on.

Data source 42 is also capable of generating a start signal on line 44 which line is connected as one of the inputs to AND gate 46. AND gate 46 and the other elements to now be described form the access-control circuit 39 for memory 10. The other input to AND gate 46 is output line 48 from clock 50. Clock 50 generates a continuous train of spaced pulses on line 48. The other places in the circuit which line 48 is connected to will be described later. Output line 52 from AND gate 46 is connected as one input to OR gate 38, and as the reset input to column-address counter 54, row-address counter 56, and distribution switch 58. Counters 54 and 56 are ring counters which are incremented from a count of 0 in a step-by-step fashion through a count of *N*-1 by increment signals applied to output lines 60 and 62 respectively from AND gates 64 and 66. From a count of *N*-1, each of the counters is incremented to a count of 0. Output lines 68 from counter 54 are connected as the inputs to *N*-1 detector 70 and as the information puts to column drivers 16. Output lines 72 from row address counter 56 are connected as the inputs to *N*-1 detector 74 and as the information inputs to row drivers 12. The energizing input to drivers 12 and 16 is output line 76 from delay 78. The duration of delay 78 is equal to one half the time duration between clock pulses applied to line 48. The input to delay 78 is clock line 48.

Output line 80 from *N*-1 detector 70 is connected as one input to OR gate 82 and as one input to AND gates 84, 86, and 88. Output line 90 from *N*-1 detector 74 is connected as one input to OR gate 92, as a second input to AND gates 84 and 86, and as one input to AND gate 94. A signal appears on lines 80 and 90 when there is count of *N*-1 in counters 54 and 56 respectively. A third input to AND gates 84 and 86 is clock line 48. Output line 96 from AND gate 84 is connected as the input to the ONE side of flip-flop 98 and output line 100 from AND gate 86 is connected as the input to ZERO side of the flip-flop. When flip-flop 98 is in its ONE state, data units are loaded into memory 10 on a row-by-row basis and when flip-flop 98 is in its ZERO, data units are loaded into memory 10 on a column-by-column basis. Output line 102 from the ONE side of flip-flop 98 is connected as the other input to OR gate 92, as a final input to AND gate 86, and as a second input to AND gate 88. Output line 104 from the ZERO side of flip-flop 98 is connected as the other input to OR gate 82, as the final input to AND gate 84, and as a second input to AND gate 94. Output lines 106 and 108 from OR gates 82 and 92 respectively are connected as one input to AND gates 66 and 64 respectively. The final input to AND gates 64, 66, 88, and 94 is a clock line 48. Output lines 110 and 112 from AND gates 88 and 94 respectively are connected as the other two inputs to OR gate 38.

Clock line 48 is also connected as the increment input to distribution switch 58. The data input to distribution switch 58 is output line 114 from sense amplifier 26. Output lines 116A–116N from distribution switch 58 may, for example, be connected to a plurality of remote terminals (not shown). Distribution switch 58 may be either an electronic or a rotating arm switching device which connects line 114 to succeeding ones of the lines 116A–116N as increment signals are applied to line 48, with line 114 being connected to line 116A when a reset signal is applied to line 52 or when the switch is set to connect to line 116N and on increment signal is applied to line 48.

*Operation of embodiment of the invention shown in FIG. 1*

Assume initially that flip-flop 98 is set to its ONE state and that a start signal is applied by data source 42 to line 44. Also assume, for the sake of illustration, that N is equal to five. The next clock pulse applied to line 48 by clock 50 therefore fully conditions AND gate 46 to generate an output signal on line 52 which is applied to reset column-address counter 54 and row-address counter 56 to a count of 0 and to distribution switch 58 to reset this switch to connect line 114 to line 116A. The signal on line 52 is also applied through OR gate 38 and line 36 to condition gate 34 to apply the first data unit, which data unit is to be applied to line 116A, through lines 32 to N-bit shift register 28. This data unit is stored in the register with its first in the right-most position and succeeding bits in succeeding positions to the left thereof.

Figure 2A:
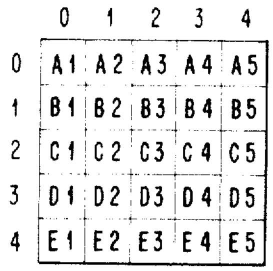
FIGS. 2A–2D are diagrams illustrating the contents of the core plane shown in FIG. 1 at various stages in the operation.

The clock pulse on line 48 is also applied to delay 78 and, a half clock time later, a signal appears on line 76, energizing drivers 12 and 16 to apply drive signals to a selected one of the drive lines 14 and to a selected one of the drive lines 18. Since column-address counter 54 and row-address counter 56 are both set to 0 at this time, it is the row 0, column 0 position in core plane 10 which is read out at this time. Assuming that the memory is initially empty, nothing is applied to sense amplifier 26 at this time. The read signals applied to the 0 ones on the lines 14 and 18 are followed by write signals on these lines which, unless there is an inhibit signal on line 20 at this time, cause a bit to be stored in the row 0, column 0 position of memory 10. Therefore, if there is a bit in the right-most position of register 28 at this time, inhibit driver 22 is deactivated and no signal appears on line 20 permitting the bit to be stored at this time whereas if there is no bit in this position of register 28, inhibit driver 22 is acivated at this time, causing this memory position to be left in its ZERO state. The A1 bit shown in FIG. 2A is in this manner stored in memory 10.

A half clock time later, a signal is again applied to clock line 48. Since flip-flop 98 is in its ONE state at this time, a signal is being applied through OR gate 92 and line 108 to one input of AND gate 64. The clock signal on line 48 fully conditions AND gate 64 to generate an output signal on increment line 60 causing the address in column-address counter 54 to be incremented to address 1. The signal on line 48 is also applied to distribution switch 58 to cause line 114 to be connected to line 116B and to shift register 28 to cause a shift-right operation which results in the first bit of the data unit in the shift register being shifted out of the register and the second bit of the data unit being shifted into the position to influence inhibit driver 22. A half clock time later, delay 78 again applies an energizing signal to line 76 resulting in the second bit of the data unit originally applied to shift register 28 being stored in the 0 row, column 1 position. The A2 bit shown in FIG. 2A is thus stored in memory 10.

Succeeding clock pulses on line 48 result in succeeding bits of the data unit originally applied to shift register 28 being stored in succeeding positions of the 0 row of core plane 10. Since it has been assumed that N is equal to 5, the fifth clock pulse applied to line 48 causes the last bit of the data unit originally stored in shift register 28 to be applied to the right-most position of his register, increments distribution switch 58 so that line 114 is connected to line 116N, and increments column-address counter 54 to a count of 4 ($N$-1). A half clock time later, the data bit in the right-most position of shift register 28 is stored in the row 0, column 4 position of memory plane 10. The A5 bit shown in FIG. 2 is in this manner stored in the system.

When the next clock pulse is applied to line 48, there is a signal on output line 80 from $N$–1 detector 70 which signal is applied to one input of AND gate 88 and through OR gate 82 to one input of AND gate 66. The signal on line 48 fully conditions AND gate 66 to generate an output signal on line 62 which increments row-address counter 56 to a count of 1. The signal on line 48 also fully conditions AND gate 88 to generate an output signal on line 110 which is applied through OR gate 38 and line 36 to condition gate 34 to pass the data unit which is ultimately to be applied to line 116B to shift register 28. Since AND gate 64 is still conditioned, the signal on line 48 is applied to increment column address counter 54 from a count of $N$-1 (for example from a count of 4) to a count of 0. The signal on line 48 is also applied to distribution switch 58 to step the switch so that line 114 is again connected to line 116A.

A half clock time later a signal is again applied to line 76, energizing drivers 12 and 16 to store the first bit of the second data unit in the row 1, column 0 position of core plane 10. The B1 bit shown in FIG. 2A is in this manner stored in the system. As the next four clock pulses are applied to line 48, the remaining bits of the second data unit are stored in the second row of core plane 10 in the same manner as the first data unit was stored in the first row of this core plane. When column-address counter 54 has again been incremented to a count of 4 (4 being equal to $N$–1 in the illustrative example with $N$–5) the next clock pulse applied to line 48 causes a new data unit to be applied to shift register 28, this data unit being one which is to be applied to the third of the lines 116, row-address counter 56 is incremented to a count of 2, column-address counter 54 is incremented to a count of 0, and distribution switch 58 is incremented to a setting which connects line 114 to line 116A. The circuit is now ready to store the third data unit in the third row of core plane 10 in the same manner as data units were stored in the first and second row of this core plane.

Data units are stored in the fourth and fifth rows of this core plane in the same manner as that described above for the preceding rows. When the E5 bit is stored in the row 4, column 4 position shown in FIG. 2A, both column-address counter 54 and row-address counter 56 have a count of 4 stored therein. Therefore, at this time, there is an output signal on line 80 from detector 70 and on line 90 from detector 74. Since there is also an output signal on line 102 from the ONE side of flip-flop 98, at the next clock time AND gates 64, 66, 86 and 88 are all fully conditioned, causing output signals which increment column-address counter 54 to a count of 0, increment row-address counter 56 to a count of 0, reset flip-flop 98 to its ZERO state, and condition gate 34 to apply the A′ data unit from data source 42 to shift register 28. The A′ data unit is the second data unit to be applied to line 116A. The signal on line 48 at this time is also applied to distribution switch 58 to cause line 114 to again be connected to line 116A. At the time that the clock pulse described above is applied to the system, the contents of core plane 10 are as shown in FIG. 2A. It will be rememebered that it is desired to apply the A data unit stored in row 1 to output line 116A, the B data unit stored in row 2 to line 116B, and so on with the E data unit stored in row 4 to be applied to line 116N.

One half clock time after the clock pulse described above is applied to the system, delay 78 generates an output signal on line 76 which energizes drivers 12 and 16 to read out the contents of the memory position indicated in column-address counter 54 and row-address counter 56. Since both of these counters were just reset, it is the row 0, column 0 position which is read out at this time. The A1 bit is therefore applied through sense line 24 and sense amplifier 26 to line 114. Since distribution switch 58 is connecting line 114 to line 116A at this time, this bit is transmitted through line 116A to, for example, a remote terminal (not shown). The A1 bit is in this manner applied to the desired output line. The read signals applied to lines 14 and 18 are followed by write signals which cause the first bit of the A′ word, the A′1 bit to be stored in the row 0, column 0 position of core plane 10.

One half clock time later, a signal is again applied to line 48. Since flip-flop 98 is now in its ZERO state, a signal is being applied through line 104 and OR gate 82 to line 106 to condition AND gate 66 to apply the signal on line 48 to increment row-address counter 56. The row-address counter is therefore incremented to a count of 1. The signal on line 48 is also applied to shift register 28 to cause the A′2 bit to be shifted into the right-most position of this register and to distribution switch 58 to cause line 114 to be connected to line 116B. One half clock time later, a signal is again applied to line 76 causing the B1 bit which is stored in the row 1, column 0 position to be applied through sense amplifier 26 and distribution switch 58 to line 116B, the desired output line, and to cause the A′2 bit now stored in the right-most position of shift register 28 to then be stored in this memory position.

During succeeding half clock times, the C1, D1, and E1 bits are read out and applied to the appropriate ones of the 116C (not shown)–116N lines and the A′3, A′4, and A′5 bits are stored in the column 0, row 2, row 3, and row 4 positions respectively. When the A′5 bit is being stored in the system, there is a count of 4 in row-address counter 56 and therefore an output signal on line 90 from detector 74. The next clock pulse therefore finds AND gates 64, 66, and 94 all fully conditioned and is therefore effective to increment column-address counter 54 to a count of 1, row-address counter 56 to a count of 0, and to condition gate 34 to pass the B′ data unit from data source 42 into shift register 28. The B′ data unit is the second data unit to be applied to line 116B. The signal applied to clock line 48 at this time also increments distribution switch 58 so that line 114 is again connected to line 116A.

The circuit is now ready to read out the A2–E2 bits from column 1 of core plane 10 and to store bits B′1–B′5 in their place. As before, each of the bits A2–E2 is applied to the appropriate one of the output lines 116A–116N.

At this point, it can be seen that whereas the initial set of data units were read into core plane 10 on a row-by-row basis, the second set of data units are being read into the core plane on a column-by-column basis. It can also be seen that at the same time that the second set of data units are being read into core plane 10, the first set of data units are being read out on a column-by-column basis and applied a bit at a time to the appropriate ones of the output lines 116A–116N.

Figure 2B:
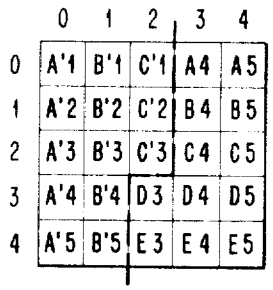

The clock pulse which is applied to line 48 after the B′5 bit has been stored in core plane 10 again finds AND gates 64, 66, and 94 fully conditioned. Counter 54 is therefore incremented to a count of 2, counter 56 incremented to a count of 0, and gate 34 conditioned to pass the C′ data unit, which data unit is to be applied to line 116C (not shown) into shift register 28. The signal on line 48 also increments distribution switch 58 to connect line 114 to line 116A. At the succeeding half clock times, the A3–E3 (FIG. 2A) bits stored in column 2 of core plane 10 are read out and applied through sense amplifier 26 and distribution switch 58 to lines 116A–116N respectively and the bits C'1–C'5 stored in shift register 28 are stored in column 2 of the core plane in a manner identical to that described for the reading out and writing into column 1 of this core plane. Half way through this operation, the contents of core plane 10 are as shown in FIG. 2B.

Figure 2C:
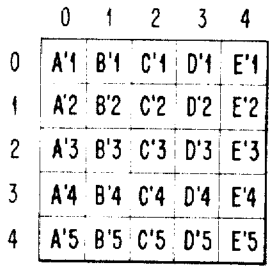

During succeeding cycles of distribution switch 58, the A4–E4 bits and the A5–E5 bits are read out from core plane 10 and the D'1–D'5 and E'1–E'5 bits read into the core plane in their place. When the E'5 bit has been read into the row 4, column 4 position of core plane 10, the contents of this memory are as shown in FIG. 2C. At this time, flip-flop 98 is in its ZERO state, counter 54 and counter 56 both have a count of 4 in them, and distribution switch 116 is set to connect line 114 to line 116N. The next clock pulse applied to line 48 therefore finds AND gates 64, 66, 84, and 94 all fully conditioned and is effective to increment both column-address counter 54 and row-address counter 56 to a count of 0, to set flip-flop 98 to its ONE state, and to pass the A'' data unit into shift register 28.

The setting of the circuit is now the same as it was after the start signal was applied to line 44 with the exception that core plane 10 now has data units stored in it as shown in FIG. 2C rather than being empty. Therefore, a half clock time later, the signal applied to line 76 energizes drivers 12 and 16 to read out the A'1 bit stored in the row 0, column 0 position of core plane 10. This bit is passed through sense amplifier 26 and distribution switch 58 to line 116A. During the write cycle of drivers 12 and 16, the A''1 bit is stored in the vacated memory position. At the next clock time, column-address counter 54 is incremented to a count of 1, and distribution switch 58 is incremented to connect line 114 to line 116B. At the next half clock time, drivers 12 and 16 are again energized to cause the B'1 bit stored in the row 0, column 1 position to be read out through sense amplifier 26 and distribution switch 58 to line 116B and to then cause the A''2 bit to be stored in this memory position.

Figure 2D:
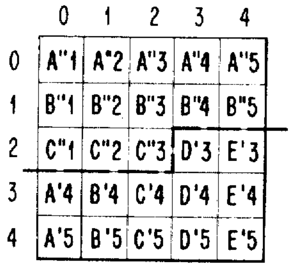

From previous discussion, it can be seen that at succeeding half clock times, the C'1, D'1, and E'1 bits will be read out from the 0 row of core plane 10 and applied to the appropriate one of the output lines 116 and the A''3–A''5 bits read into the memory in their place. The memory will then proceed to read out the remaining bits of the ' data units on a row-by-row basis and to read in the new bits of the '' data units in their place, also on a row-by-row basis. The contents of core plane 10 half way through this operation are shown in FIG. 2D.

From the few cycles of operation described above, it can be seen that the system shown in FIG. 1 is capable of accepting data units to be applied to output lines 116A–116N in parallel, of storing these data units in core plane 10, on either a row-by-row or column-by-column basis, of reading these data units out on the opposite basis from which they were read in, and of storing the next set of data units in the system on the same opposite basis in an endless succession of cycles.

*Alternative embodiments*

Figure 3:
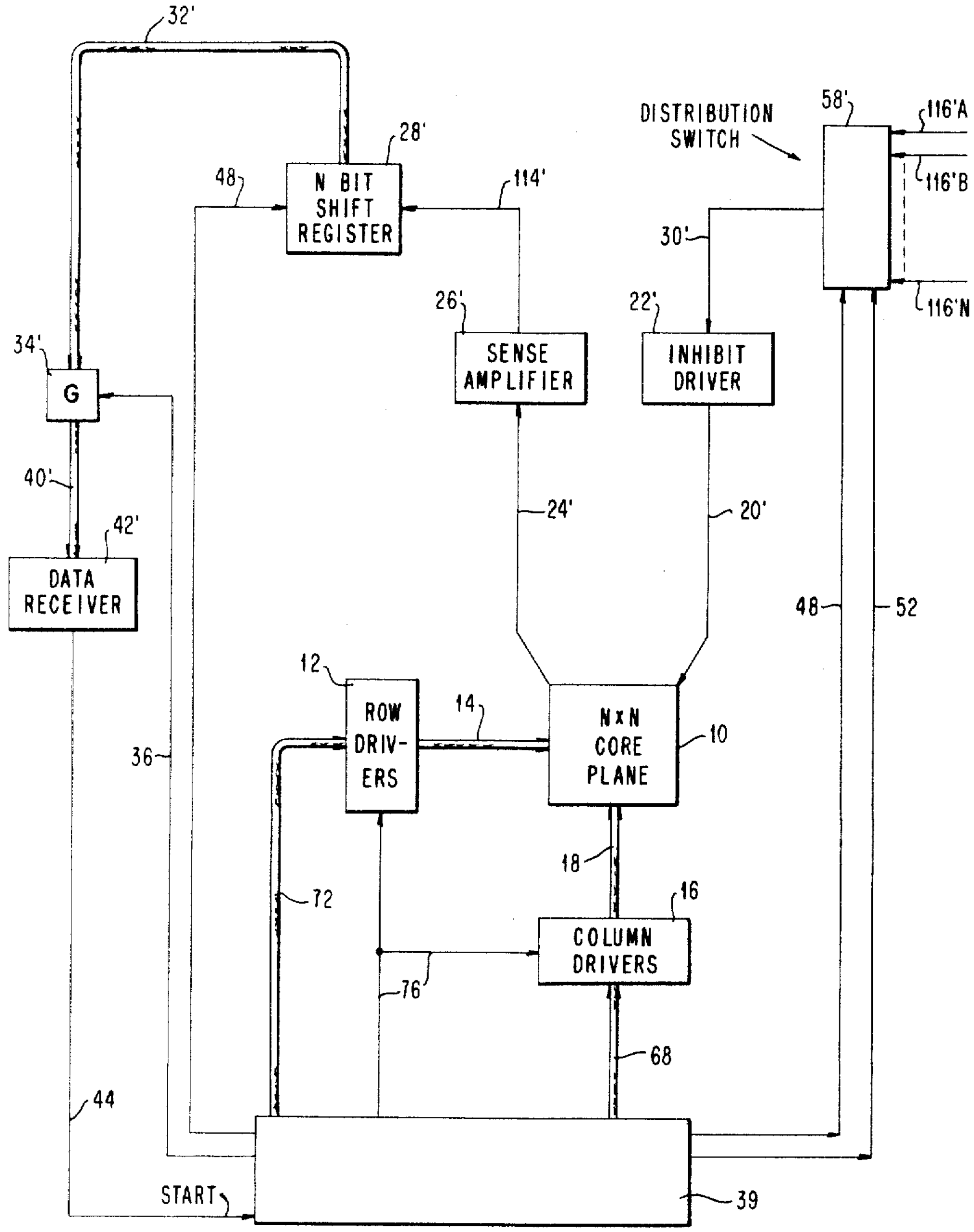
FIG. 3 is a block diagram of a data unit assembling embodiment of the invention.

FIG. 3 shows a data unit assembling embodiment of the invention. All elements in this embodiment of the invention are either identical or analogous to those shown in FIG. 1. The identical elements have been given the same reference numeral as in FIG. 1 and the analogous elements have been given a prime reference numeral. Referring to FIG. 3, it is seen that this embodiment of the invention includes the N x N magnetic core plane 10 with its energizing row and column drivers 12 and 16 and access control circuit 39. However, for this embodiment of the invention, the position of the inhibit driver 22' and the sense amplifier 26' have been reversed. Inhibit driver 22' is in this embodiment of the invention energized under control of distribution switch 58' and output line 114' from sense amplifier 26' is connected as the input to the right-most bit position in N bit shift register 28'. Lines 116'A–116'N are connected as inputs to distribution switch 58' and lines 32', which are now output lines from shift register 28', are connected as inputs to gate 34'. Output lines 40' from gate 34' are connected as inputs to data receiver 42'. Data receiver 42' may, for example, be a memory in a digital computer system which places the received data units in succeeding address positions. Start line 44, gate control line 36, shift line 48, and reset line 52 all perform the same functions as in the embodiment of the invention shown in FIG. 1.

In operation, assume again that a start signal is applied to line 44, causing the system to be reset as for the embodiment of the invention shown in FIG. 1 and that flip-flop 98 (FIG. 1) in control circuit 39 is in its ZERO state, causing memory 10 to be accessed on a column-by-column basis. Distribution switch 58' is initially set to connect line 116'A to line 30'. The A1 bit appearing on this line at this time is stored in the row 0, column 0 position of core plane 10. A signal is then applied to line 48, causing distribution switch 58' to connect line 116'B to line 30'. At the next half clock time, the B1 bit is therefore stored in the column 0, row 1 position of core plane 10.

From the discussion of the operation of the embodiment of the invention shown in FIG. 1, it can be seen that with the memory being accessed on a column-by-column basis when all of the memory positions in the core plane 10 have been accessed, the contents of this memory will be as shown in FIG. 2A. When this occurs, flip-flop 98 (FIG. 1) in control circuit 39 is switched to its ONE state, causing memory 10 to be accessed on a row-by-row basis and the second set of data units to be stored in memory 10 start to appear on lines 116A–116N. The circuit is now ready to read out the A1 bit stored in row 0, column 0 position of core plane 10 and to store this bit in the right-most position of shift register 28'. The A'1 bit now appearing on line 116'A is then stored in the row 0, column 0 position of core plane 10. The next clock pulse on line 48 shifts the bit just stored in shift register 28' one position to the left, leaving the right-most position vacant, and steps distribution switch 58' to connect line 116'B to line 30'. At the next half clock time, the B'1 bit is stored in the row 0, column 1 position of core plane 10 and the A2 bit which was in this position stored in the right-most position of shift register 28'. This process is repeated until the entire A data unit is shifted in shift register 28' and the first bit of each of the ' data units stored in row 0 of the core plane 10. At this time, a signal appears on line 36, conditioning gate 34' to pass the data unit stored in shift register 28' to data receiver 42', and a signal appears on line 48 to step distribution switch 58' to its initial position with line 116'A connected to line 30'.

From the above description and the previous description of the operation of the embodiment of the invention shown in FIG. 1, it can be seen that during succeeding cycles of distribution switch 58', the B data unit, C data unit, D data unit, and E data unit will be applied in succession to shift register 28' and from this register to data receiver 42', while the ' data units will be stored in core plane 10 on a row-by-row basis until the contents of this core plane are as shown in FIG. 2C. As with the embodiment of the invention shown in FIG. 1, the core plane shown in FIG. 3 continues to store data units to be assembled alternately on a row-by-row or a column-by-column basis in an endless succession of cycles.

Figure 4:
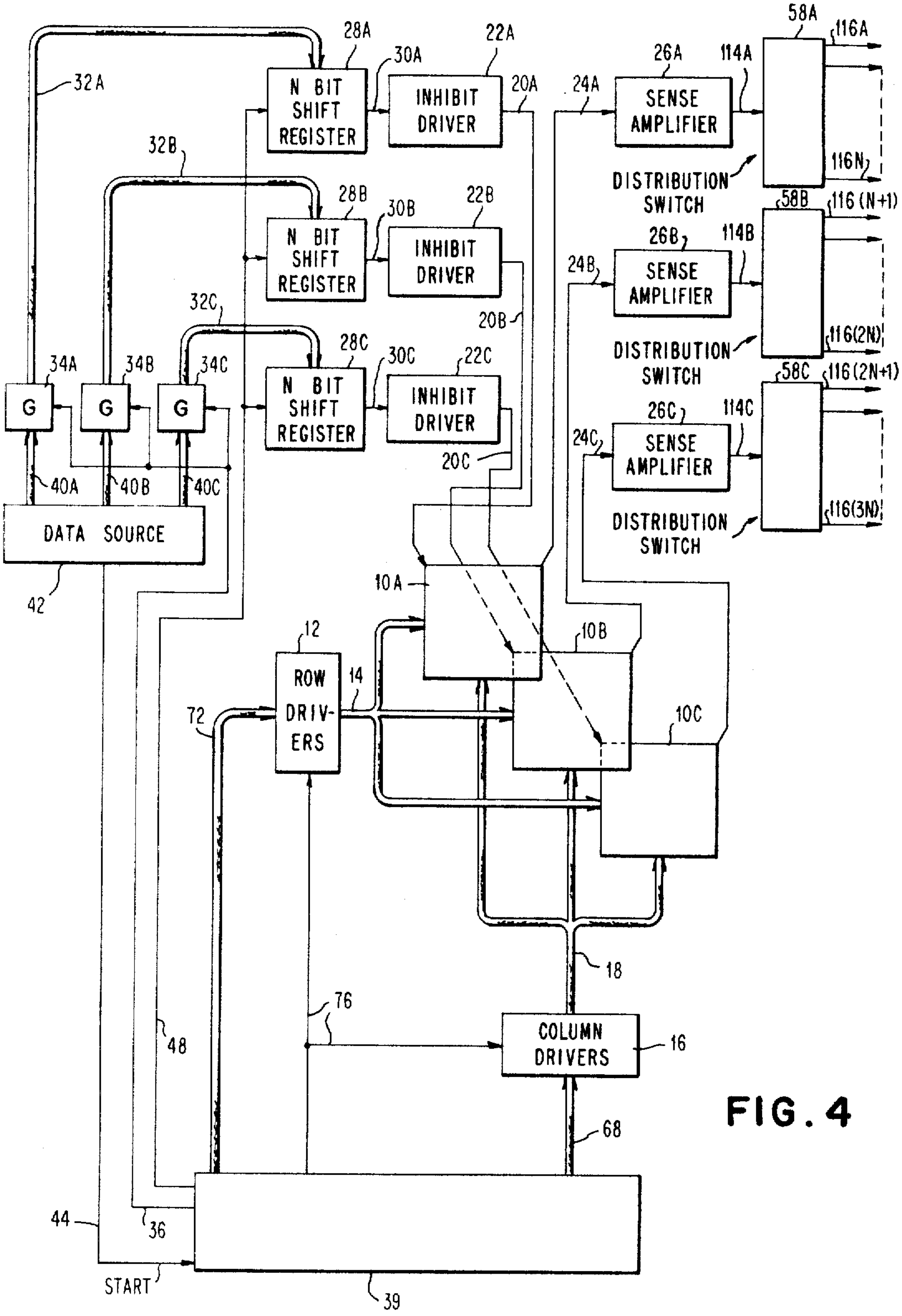
FIG. 4 is a block diagram of an alternative data unit distribution embodiment of the invention.

In the two embodiments of the invention described above, it has been assumed that the number of bits in a given data unit are equal to the number of terminals being serviced so that a square N x N core plane may be employed. It is apparent that this is an idealize condition and that for the system to be generally applicable, it must be capable of functioning where the number of bits in a data unit are not equal to the number of terminals. FIG. 4 shows a scheme for distributing data units on a serial-by-bits basis to a plurality of remote terminals where the number of remote terminals is an integral multiple of the number of bits in a single data unit. For the embodiment of the invention shown in FIG. 4, it is assumed that there are 3N remote terminals, where N is the number of bits in a data unit.

It is seen that with this embodiment of the invention, there are three core planes 10A–10C rather than a single core plane as shown in FIG. 1, that each core plane has its own gate 34, shift register 28, inhibit driver 22, inhibit line 20, sense line 24, sense amplifier 26, and distribution switch 58, but that the three core planes share a common set of row and column drivers and a common access control circuit 39.

With this embodiment of the invention, data units, for example, A–E which are to be applied to lines 116A–116N respectively would be applied through gate 34A and shift register 28A to core plane 10A. The manner of operation in handling these data units would be identical to that described for FIG. 1. At the same time that data units A–E are being handled in core plane 10A, a set of data units, for example, F–J which are to be distributed on lines 116 $(N+1)$–116 (2N) respectively are applied through gate 34B and shift register 28B to core plane 10B, and a set of data units K–O which are to be distributed on lines 116 $(2N+1)$–116 (3N) respectively are applied through gate 34C and shift register 28C to be stored in core plane 10C. Since all three core planes are operated by the same access control circuitry 39, the distribution of the data units to the appropriate ones of the output lines occur simultaneously in the three core planes. Since each of the three operations which are going on simultaneously in the embodiment of the invention shown in FIG. 4 are identical to the single operation going on in the embodiment of the invention shown in FIG. 1, it is not felt that these operations need be described again.

It is, of course, apparent that the number of terminals will not always be an integral multiple of the number of bits in the data unit being employed. This problem may be solved by inserting dummy bits in certain positions of the matrix during the course of the operation. For example, if, in the embodiment of the invention shown in FIG. 1, a five bit data unit were employed but six terminals were being serviced, a six-by-six matrix might be employed with a 0 or dummy bit being tacked on to the end of each data unit as it is stored in the memory. Similarly, if a five-bit data unit were employed but there were only four terminals being serviced, a five-by-five matrix could still be employed with a dummy data unit being stored in the matrix after every fourth data unit is stored.

While in the above described embodiments of the invention, a square N x N matrix array has always been employed, a square array is not essential to the operation of the invention. However, the addressing sequence becomes considerably more complicated when other than square arrays are used.

While the embodiment of the invention shown in FIG. 4 and the dummy bit insertion scheme are both referenced to the data unit distribution embodiment of the invention shown in FIG. 1, it is apparent that these schemes are equally applicable to the data unit assembling embodiment of the invention shown in FIG. 3. It is also apparent that where it is desired to distribute data units to the transmission lines on a serial-by-byte, or, more generally on a serial-by-character basis rather than on a serial-by-bit basis (i.e. where each line 116 is in fact a plurality of lines equal to the number of bits in the character being sent) or where it is desired to assemble data units which are being fed in on a plurality of transmission lines on a serial-by-character basis, that the circuitry of FIGS. 1 and 3 respectively could be employed without alteration except for the use of a three dimensional core array rather than a single core plane and a corresponding multiplicity of shift registers, inhibit drivers, sense amplifiers, distribution switches, etc. A single set of control circuits 39 could still be employed.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A buffer for a data conversion system comprising:
a memory device having a plurality of individually addressable memory positions arranged in an array of rows and columns;
means for applying data units to said memory device a character at a time;
control means alternately operable for causing said memory device to be accessed on either a row-by-row or column-by-column basis;
means for accepting the outputs from said memory device a character at a time;
means responsive to the accessing of a full row or a full column of said memory device for causing a new cycle of said applying and said accepting means to be initiated; and
means responsive to all of the memory positions in said memory device being accessed for altering the operable state of said control means.

2. A buffer for a data conversion system comprising:
a memory device having a plurality of individual memory positions arranged in an array of rows and columns;
means for applying data units to said memory device on a bit-by-bit basis;
control means alternately operable for causing said memory device to be accessed on either a row-by-row or column-by-column basis;
means for accepting the outputs from said memory device on a bit-by-bit basis;
means responsive to the accessing of a full row or a full column of said memory device for causing a new cycle of said applying and said accepting means to be initiated; and
means responsive to all of the memory positions in said memory device being accessed for altering the operable state of said control means.

3. A device of the type described in claim 2 wherein the memory positions in said memory device are arranged in a square array with a like number of memory positions in said rows and columns.

4. A device for distributing data units to corresponding output lines on a serial-by-character basis comprising:
a memory device having a plurality of individually addressable memory positions arranged in a matrix of rows and columns;
means for initially storing data units in said memory device on either a row-by-row or column-by-column basis;
means, including in part said above-mentioned means, for reading out the initially stored data units on the opposite basis from that on which they were stored and for storing new data units on said opposite basis, said means being operative to perform each succeeding read-write cycle on the other basis than that on which the last read-write cycle was performed; and
means for distributing the data units read out from said memory device onto appropriate ones of said output lines.

5. A device of the type described in claim 4 wherein the rows and columns of said memory device contain a like number of memory positions.

6. A device for distributing data units to corresponding output lines on a serial-by-bit basis comprising:
- a memory device having a plurality of individually addressable memory positions arranged in a matrix of rows and columns;
- means for accepting a full data unit to be applied to one of said output lines and for applying said data unit to said memory device a bit at a time;
- means for initially storing data units in said memory device on either a row-by-row or column-by-column basis;
- means, including in part said above-mentioned means, for reading out the initially stored data units on the opposite basis from that on which they were stored and for storing new data units on said opposite basis, said means being operative to perform each succeeding read-write cycle on the other basis than that on which the last read-write cycle was performed; and
- means for distributing the data units read out from said memory device onto appropriate ones of said output lines.

7. A device for distributing data units to corresponding output lines on a serial-by-bit basis comprising:
- a matrix memory having a plurality of memory positions;
- input means for applying a data unit to be applied to a given one of said output lines to said matrix memory a bit at a time;
- means for accessing memory positions in said matrix memory, said means being alternately operative to sequentially access memory positions in said matrix memory in two mutually perpendicular directions, said accessing means switching from one direction of access to the other when all memory positions have been accessed in the direction being used;
- cyclically operating means for sequentially connecting to said output lines;
- means for applying the output from an accessed memory position to said cyclically operating means; and
- means for storing the bit applied to said matrix memory by said input means in the accessed memory position.

8. A device for distributing data units to corresponding output lines on a serial-by-bit basis comprising:
- a memory device having a plurality of individually addressable memory positions arranged in an array of rows and columns;
- means for accepting data units to be applied to said output lines in parallel and for applying said data units to said memory device a bit at a time;
- control means alternately operable for causing said memory device to be accessed on either a row-by-row or column-by-column basis;
- cyclic means for distributing the outputs from the accessed memory positions in said memory device to appropriate ones of said output lines;
- means responsive to the accessing of a full row or a full column of said memory device for causing a new data unit to be applied to said data unit accepting means, and for initiating a new cycle of said cyclic means; and
- means responsive to all of the memory positions in said memory device being accessed for altering the operable state of said control means.

9. A device of the type described in claim 8 wherein the memory positions in said memory device are arranged in a square array with a like number of memory positions in said rows and columns.

10. A device for distributing data units to corresponding output lines on a serial-by-bit basis comprising:
- a magnetic core matrix memory in which said cores are arranged in an array of rows and columns;
- a shift register;
- means for applying data units in parallel to said shift register;

- means for applying the contents of said shift register a bit at a time to said memory;
- cyclic means for applying succeeding outputs from said memory to succeeding ones of said output lines;
- bistable means for controlling the manner in which cores in said memory are to be accessed, each access including a read-out cycle followed by a write-in cycle;
- means responsive to said bistable means being in one of its states for causing said cores to be accessed a row at a time;
- means responsive to said bistable means being in its other state for causing said cores to be accessed a column at a time;
- means operable after each acecss to a core for shifting said shift register so as to cause a new bit to be applied to said memory and for incrementing said cyclic means so as to apply the output from said memory to a different one of said output lines;
- means responsive to the accessing of a full row or a full column of said memory for causing said data unit applying means to apply a new data unit to said shift register and for initiating a new cycle of said cyclic means; and
- means responsive to all the cores in said memory being accessed for altering the state of said bistable means.

11. A device for distributing data units to corresponding ones of N output lines on a serial-by-bit basis comprising:
- a magnetic core matrix memory in which said cores are arranged in an array of N rows and N columns;
- an N bit shift register;
- means for applying data units in parallel to said shift register;
- means for applying the contents of said shift register a bit at a time to said memory;
- cyclic means for applying succeeding outputs from said memory to succeeding ones of said N output lines;
- bistable means for controlling the manner in which cores in said memory are to be accessed, each access including a read-out cycle followed by a write-in cycle;
- means responsive to said bistable means being in one of its states for causing said cores to be accessed a row at a time;
- means responsive to said bistable means being in its other state for causing said cores to be accessed a column at a time;
- means operable after each access to a core for shifting said shift register so as to cause a new bit to be applied to said memory and for incrementing said cyclic means so as to apply the output from said memory to a different one of said output lines;
- means responsive to the accessing of a full row or a full column of said memory for causing said data unit applying means to apply a new data unit to said shift register and for initiating a new cycle of said cyclic means; and
- means responsive to all the cores in said memory being accessed for altering the state of said bistable means.

12. A device for assembling data units appearing on a plurality of lines on a serial-by-bit basis comprising:
- a memory device having a plurality of addressable memory positions arranged in an array of rows and columns;
- cyclic means for connecting the input to said memory device to succeeding ones of said lines;
- means for forming succeeding bits at the output of said memory device into a data unit;
- control means alternately operable for causing said memory device to be accessed on either a row-by-row or column-by-column basis;
- means responsive to the accessing of a full row or a full column of said memory device for causing a data unit to be read out from said forming means and for initiating a new cycle of said cyclic means; and means responsive to all of the memory positions in said memory device being accessed for altering the operable state of said control means.

13. A device of the type described in claim 12 wherein the memory positions in said memory device are arranged in a square array with a like number of memory positions in said rows and columns.

14. A device for assembling data units which appear on a plurality of lines on a serial-by-bit basis comprising:

a magnetic core matrix memory in which said cores are arranged in an array of rows and columns;

cyclic means for connecting the input to said memory to succeeding ones of said lines;

a shift register;

means for reading data units out of said shift register in parallel;

bistable means for controlling the manner in which cores in said memory are to be accessed, each access including a read-out cycle followed by a write-in cycle;

means responsive to said bistable means being in one of its states for causing said cores to be accessed a row at a time;

means responsive to said bistable means being in its other state for causing said cores to be accessed a column at a time;

means operable after each access to a core for shifting said shift register so as to permit a new bit from said memory to be stored therein and for incrementing said cyclic means so as to connect the input to said memory to a different one of said lines;

means responsive to the accessing of a full row or a full column of said memory for causing a data unit to be read out of said shift register and for initiating a new cycle of said cyclic means; and means responsive to all the cores in said memory being accessed for altering the state of said bistable means.

15. A device for assembling data units which appear on N lines on a serial-by-bit basis comprising:

a magnetic core matrix memory in which said cores are arranged in an array of N rows and N columns;

cyclic means for connecting the input to said memory to succeeding ones of said N lines;

an N bit shift register;

means for reading data units out of said shift register in parallel;

bistable means for controlling the manner in which cores in said memory are to be accessed, each access including a read-out cycle followed by a write-in cycle;

means responsive to said bistable means being in one of its states for causing said cores to be accessed a row at a time;

means responsive to said bistable means being in its other state for causing said cores to be accessed a column at a time;

mean operable after each access to a core for shifting said shift register so as to permit a new bit from said memory to be stored therein and for incrementing said cyclic means so as to connect the input to said memory to a different one of said lines;

means responsive to the accessing of a full row or a full column of said memory for causing a data unit to be read out of said shift register and for initiating a new cycle of said cyclic means; and means responsive to all the cores in said memory being accessed for altering the state of said bistable means.

16. A buffer for a data conversion system comprising:

a plurality of memory devices, each having individually addressable memory positions arranged in an array of rows and columns;

separate means for applying data units to each of said memory devices a character at a time;

control means alternately operable for causing each of said memory devices to be accessed on either a row-by-row or column-by-column basis;

separate means for accepting the outputs from said memory devices a character at a time;

means responsive to the accessing of a full row or a full column in a memory device for causing a new cycle of the associated applying and accepting means to be initiated; and means responsive to all the memory positions in the memory devices being accessed for altering the operable state of said control means.

17. A device for distributing data units to corresponding output lines on a serial-by-bit basis comprising:

a plurality of memory devices, each having a like number of individually addressable memory positions arranged in an array of rows and columns;

separate means for accepting data units in parallel and for applying said data units to the corresponding memory device a bit at a time;

control means alternately operable for causing said memory devices to be accessed on either a row-by-row or column-by-column basis;

separate cyclic means for distributing the outputs from the accessed memory positions for eeach of said memory devices to appropriate ones of said output lines;

means responsive to the accessing of a full row or a full column in said memory devices for causing a new data unit to be applied to each of said data unit accepting means and for initiating a new cycle of each of said cyclic means; and means responsive to all the memory positions in said memory devices being accessed for altering the operable state of said control means.

18. A device for distributing data units to corresponding ones of M x N output lines on a serial-by-bit basis comprising:

M magnetic core matrix memories, the cores in each of said memories being arranged in an array of N rows and N columns;

an N bit shift register for each of said arrays;

means for applying data units in parallel to each of said shift registers;

means for applying the contents of each of said shift registers a bit at a time to each of said memories;

a cyclic means for applying the succeeding outputs from each of said memories to succeeding ones of the N output lines associated with the memory;

bistable means for controlling the manner in which cores in said memories are to be accessed, each access including a read-out cycle followed by a write-in cycle;

means responsive to said bistable means being in one of its stable states for causing the cores in each of said memories to be accessed a row at a time;

means responsive to said bistable means being in its other state for causing the cores in each of said memories to be accessed a column at a time;

means operable after each access to the corresponding core in each of said memories for shifting the shift registers so as to cause a new bit to be applied to each of said memories and for incrementing the cyclic means so as to apply the output from each of said memories to a different one of said output lines;

means responsive to the accessing of a full row or a full column in said memories for causing said data unit applying means to apply a new data unit to each of said shift registers and for initiating a new cycle in each of said cyclic means; and means responsive to all the cores in said memories being accessed for altering the state of said bistable means.

19. A device for assembling data units appearing on a plurality of lines on a serial-by-bit basis comprising:

a plurality of memory devices, each having a like number of individually addressable memory positions arranged in an array of rows and columns, and each having a group of said lines associated with them;

separate cyclic means for connecting the input to each of said memory devices to succeeding ones of the associated lines;

separate means for forming succeeding bits at the output of each of said memory devices into a data unit;

control means alternately operable for causing said memory devices to be accessed on either a row-by-row or column-by-column basis;

means responsive to the accessing of a full row or a full column in said memory device for causing a data unit to be read out from each forming means and for initiating a new cycle for each of said cyclic means; and means responsive to all the memory positions in said memory device being accessed for altering the operable state of said control means.

20. A device for assembling data units which appear on M x N lines on a serial-by-bit basis comprising:

M magnetic core matrix memories, the cores in each of said memories being arranged in an array of N rows and N columns;

a separate cyclic means for connecting the input to each of said memories to succeeding ones of the N lines associated therewith;

an N bit shift register for each of said memories;

means for reading data units out of each of said shift registers in parallel;

bistable means for controlling the manner in which cores in said memories are to be accessed, each access including a read-out cycle followed by a write-in cycle;

means responsive to said bistable means being in one of its states for causing the cores in said M memories to be accessed a row at a time;

means responsive to said bistable means being in its other state for causing the cores in said M memories to be accessed a column at a time;

means operable after each access to the corresponding core in each of said memories for shifting said shift registers so as to permit a new bit from the associated memory to be stored therein and for incrementing said cyclic means so as to connect the input of each memory to a different one of the associated lines;

means responsive to the accessing of a full row or a full column in said memories for causing a data unit to be read out from each of said shift registers and for initiating a new cycle in each of said cyclic means; and means responsive to all the cores in said memories being accessed for altering the state of said bistable means.

References Cited

UNITED STATES PATENTS

| | | | |
|---|---|---|---|
| 2,985,865 | 5/1961 | Merz | 340—172.5 |
| 3,061,818 | 10/1962 | Newby | 340—172.5 |
| 3,209,330 | 9/1965 | Bonomo | 340—172.5 |

ROBERT C. BAILEY, *Primary Examiner.*

I. S. KAVRUKOV, *Assistant Examiner.*